United States Patent
Hoar

(10) Patent No.: US 11,443,299 B2
(45) Date of Patent: Sep. 13, 2022

(54) GIFT CARD USE NOTIFICATION

(71) Applicant: Comenity LLC, Columbus, OH (US)

(72) Inventor: Melissa Hoar, Columbus, OH (US)

(73) Assignee: Comenity LLC, Columbus, OH (US)

( * ) Notice: Subject to any disclaimer, the term of this patent is extended or adjusted under 35 U.S.C. 154(b) by 152 days.

(21) Appl. No.: 16/691,286

(22) Filed: Nov. 21, 2019

(65) Prior Publication Data

US 2021/0065161 A1 Mar. 4, 2021

Related U.S. Application Data

(60) Provisional application No. 62/892,764, filed on Aug. 28, 2019.

(51) Int. Cl.
*G06Q 20/34* (2012.01)
*H04L 67/55* (2022.01)
*G06Q 30/00* (2012.01)
*H04L 51/42* (2022.01)

(52) U.S. Cl.
CPC ......... *G06Q 20/342* (2013.01); *G06Q 30/016* (2013.01); *H04L 67/26* (2013.01); *H04L 51/22* (2013.01)

(58) Field of Classification Search
None
See application file for complete search history.

(56) References Cited

U.S. PATENT DOCUMENTS

| | | | |
|---|---|---|---|
| 9,639,894 B1 * | 5/2017 | Arnone | G06Q 20/34 |
| 10,074,081 B1 * | 9/2018 | Radlow | G06Q 20/34 |
| 2011/0153462 A1 * | 6/2011 | Granich | G06Q 30/0601 705/41 |
| 2012/0150605 A1 | 6/2012 | Isaacson et al. | |
| 2012/0239474 A1 * | 9/2012 | Healy | G06Q 30/0207 705/41 |
| 2013/0290172 A1 * | 10/2013 | Mashinsky | G06Q 20/387 705/39 |
| 2016/0180329 A1 * | 6/2016 | Suberville | G06Q 20/349 705/44 |
| 2016/0210600 A1 | 7/2016 | Sobek | |
| 2016/0335628 A1 * | 11/2016 | Weigold | G06Q 20/3674 |
| 2017/0011387 A1 * | 1/2017 | Lennon | G06Q 30/00 |
| 2017/0221046 A1 * | 8/2017 | Mikuriya | G06Q 20/342 |
| 2017/0344981 A1 * | 11/2017 | Jain | G06Q 20/10 |
| 2017/0344990 A1 * | 11/2017 | Kohli | G06Q 20/1085 |
| 2019/0005558 A1 * | 1/2019 | Morris | G06Q 20/06 |
| 2019/0370805 A1 | 12/2019 | Van Os et al. | |
| 2020/0019967 A1 | 1/2020 | Abdi Taghi Abad et al. | |
| 2020/0193423 A1 | 6/2020 | Jangama et al. | |
| 2021/0258320 A1 * | 8/2021 | Butler | G06Q 20/342 |
| 2021/0264389 A1 * | 8/2021 | Crossfield | G06Q 20/363 |

* cited by examiner

*Primary Examiner* — Dhairya A Patel

(57) ABSTRACT

A system and method for gift card use notification is disclosed. The method receives at a gift card use notification system, an indication that a specific gift card was used for a purchase. The information from the notice is used to identify the customer that had given the specific gift card. Contact information for the customer that had given the specific gift card is determined. The gift card use notification system provides to the customer, via the contact information, a use notification indicating that the specific gift card had been used.

20 Claims, 7 Drawing Sheets

10

400

```
RECEIVES, AT A CREDIT ACCOUNT MANAGEMENT SYSTEM, A
REQUEST FOR A SHORT-TERM AUTHORIZED PASS TO BE PROVIDED
FROM A CREDIT ACCOUNT OF THE FIRST PARTY TO THE SECOND
PARTY, THE REQUEST COMPRISING: AN AMOUNT TO BE ALLOCATED
TO THE SHORT-TERM AUTHORIZED PASS, AND AN IDENTIFIER FOR
THE SECOND PARTY
402
```

```
GENERATES A SUB-ACCOUNT FROM THE CREDIT ACCOUNT,
COMPRISING: ALLOCATING A PART OF THE CREDIT ACCOUNT TO
FORM A SUB-ACCOUNT; SETTING A CREDIT LIMIT ON THE SUB-
ACCOUNT TO THE AMOUNT TO BE ALLOCATED; ASSIGNING A VIRTUAL
ACCOUNT NUMBER (VAN) TO THE SUB-ACCOUNT; AND GENERATING
THE SHORT-TERM AUTHORIZED PASS USING THE VAN OF THE SUB-
ACCOUNT
404
```

```
PROVIDES, FROM THE CREDIT ACCOUNT MANAGEMENT SYSTEM AND
TO THE SECOND PARTY, THE SHORT-TERM AUTHORIZED PASS,
WHEREIN NO FUNDS ARE TAKEN FROM THE CREDIT ACCOUNT OF THE
FIRST PARTY UNTIL THE SHORT-TERM AUTHORIZED PASS IS USED
406
```

```
RECEIVES, AT A GIFT CARD USE NOTIFICATION SYSTEM, AN
INDICATION THAT A SPECIFIC GIFT CARD WAS USED FOR A
PURCHASE
602
```
↓
```
USES INFORMATION FROM THE INDICATION TO IDENTIFY A CUSTOMER
THAT HAD GIVEN THE SPECIFIC GIFT CARD
604
```
↓
```
DETERMINES A CONTACT INFORMATION FOR THE CUSTOMER THAT
HAD GIVEN THE SPECIFIC GIFT CARD
606
```
↓
```
PROVIDES, FROM THE GIFT CARD NOTIFICATION SYSTEM AND TO THE
CUSTOMER VIA THE CONTACT INFORMATION, A USE NOTIFICATION
INDICATING THAT THE SPECIFIC GIFT CARD HAD BEEN USED
608
```

FIG. 6

GIFT CARD USE NOTIFICATION

CROSS REFERENCE TO RELATED APPLICATIONS (PROVISIONAL)

This application claims priority to and benefit of U.S. Provisional Patent Application No. 62/892,764 filed on Aug. 28, 2019, entitled "GIFT CARD USE NOTIFICATION" by Melissa Hoar, and assigned to the assignee of the present application, the disclosure of which is hereby incorporated by reference in its entirety.

BACKGROUND

Company specific, brand specific and even store specific gift card programs make nice gift ideas. By issuing gift cards, the provider is able to direct customer spending. Similarly, the giver of the gift card can provide the gift card to a recipient thereby showing the recipient that a thoughtful attempt was made by the giver, instead of the giver merely putting cash in a card. However, once a gift card is purchased, the money is spent by the giver, regardless of whether or not the gift card is redeemed. Moreover, the giver is never assured that the gift card has been used, has not been lost, or the like.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 4 is a flowchart of a method for obtaining a short-term authorized pass, in accordance with an embodiment.

FIG. 6 is a flowchart of a method for providing gift card use notification, in accordance with an embodiment.

DESCRIPTION OF EMBODIMENTS

Figure 1:
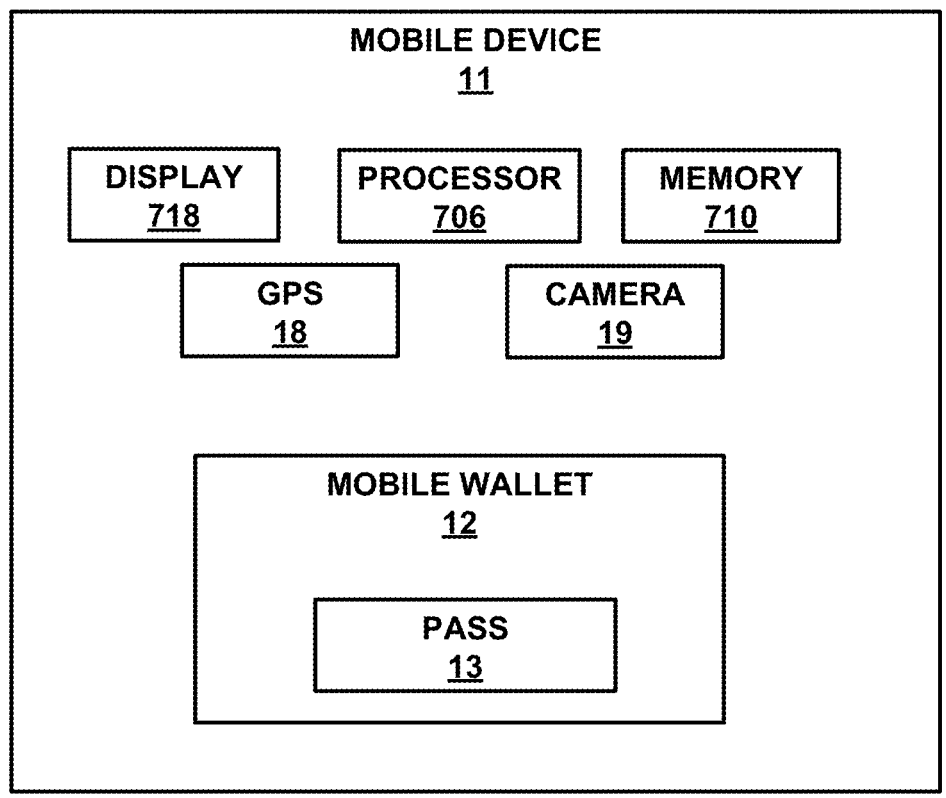
FIG. 1 is a block diagram of a mobile device, in accordance with an embodiment.

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended Claims. In some embodiments, all or portions of the electronic computing devices, units, and components described herein are implemented in hardware, a combination of hardware and firmware, a combination of hardware and computer-executable instructions, or the like. In one embodiment, the computer-executable instructions are stored in a non-transitory computer-readable storage medium. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

Notation and Nomenclature

Unless specifically stated otherwise as apparent from the following discussions, it is appreciated that throughout the present Description of Embodiments, discussions utilizing terms such as "selecting", "outputting", "allowing," "limiting," "issuing," "preventing," "inputting", "providing", "receiving", "utilizing", "obtaining", "performing", "accessing", "authorizing" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

It should be appreciated that the obtaining, accessing, or utilizing of information conforms to applicable privacy laws (e.g., federal privacy laws, state privacy laws, etc.).

A brand specific credit account refers to a credit account that is available for use only at locations related to the brand. E.g., Mike's store has a brand specific credit account that allows Marsha, a Mike's store customer, to purchase with credit at Mike's store using a Mike's brand specific credit account. However, Marsha cannot use the Mike's brand specific credit account to make purchases at her local gas station. A brand specific credit account may also be referred to as a private label card, e.g., a card that can be used for purchases only at the store on the label.

A co-branded card refers to a card that has a store on the label as well as an underlying credit card network with an accompanying logo. As such, a co-branded card may be used for purchases at the store on the label as well as at other stores that accept that credit card network's credit cards.

It is well known that gift card redemption rates hover around 60%. This redemption level is a shortcoming to the giver of the gift card, the recipient of the gift card, and the company backing the gift card. For example, with respect to the giver, once the gift card is given there is no way for the giver to track (or follow) or otherwise ensure that the gift card was used, that it was not lost, forgotten, etc. After giving a gift card, the giver has paid the gift card amount (e.g., $50) and is left in the dark as to whether or not the gift card is ever used.

With respect to the recipient, if the recipient loses the gift card, they are likely looking at a complete loss. If the recipient redeems only a portion of the gift card, they are left with a gift card having a remaining small amount of money they did not spend. Depending upon the consumer, they could throw away the gift card with the minimal amount left on it, put the gift card to the side in a drawer for later use, lose the card, etc.

With respect to the company backing the gift card, if the gift card is not redeemed in full at the time of the recipient's initial purchase, as stated above, the outstanding liability remains on the company's books. Depending upon the applicable laws, this liability will need to be tracked, and accounted for, by the bookkeeper until it is deemed expired, or in perpetuity if no expiration is allowed. Moreover, while some gift cards will promote the underlying company by causing additional monies to be spent at the company, it is just as likely that the loss of a gift card combined with the company's inability to replace the lost gift card will cause animosity between the purchaser, the recipient, and the company.

For example, if the gift card recipient loses a $100 gift card for "Sporting goods by Bob" (Bob) when the customer contacts "Bob" and tells "Bob" about the loss, "Bob" will have a very limited solution. That is, since the gift card is likely active and still redeemable, "Bob" is put in a position of rejecting the customer, providing a reduced amount to the customer, or providing a replacement gift card which could result in a $100 loss for "Bob". Each of these solutions, could cause ill will. For example, if the gift card recipient indicates to the gift card giver that "Bob" is not doing anything about the lost gift card, the giver (e.g., the gift card purchaser) will also feel cheated because they already spent the money to purchase the gift card and now their money is lost. Moreover, it may even be spent by someone other than the intended recipient.

In such a case, hurt feelings and bad publicity are likely to occur, particularly given the ease and pervasive use of Internet reviews, such as company reviews, customer reviews, and the like. These types of gift card problems could cause a bad review that could include deleterious comments about the brand, a lowering of the brand's ranking, a reduction in the number of stars for the brand, and the like. Thus, while gift cards can be a valuable source of focused customer spending, they can also be significantly detrimental to a company's customer appreciation outlook, etc.

Embodiments described herein provide a solution that overcomes a number of the gift card issues previously discussed. Importantly, instead of the customer purchasing a "blind" gift card, of which the customer no longer has any connection thereto after the purchase, the embodiments described herein, provide a solution which differs significantly from the conventional processes. In conventional approaches, after a gift-card is purchased, the customer that made the purchase is "blind". That is, after the purchase and giving of the gift card, the customer no longer has any connection thereto. The giver is never sure of whether or not the card was used, forgotten, or if it was used, what was purchased.

In contrast, the present embodiments, as will be described herein, provide a previously unknown procedure for allowing a customer to create, from their own credit account, a short-term authorized pass with a fixed amount of credit thereon, and assign the short-term authorized pass to the desired gift recipient. By providing the short-term authorized pass, from their own already existing account, the gift giver can realize a number of important solutions, modification, and actions that are not available in the present "blind" gift card scenario. For example, the gift giver can see if the short-term authorized pass has been used, they can track the amount spent with the short-term authorized pass, they can provide a prompt to the gift receiver if the short-term authorized pass has not been used, they can cancel the short-term authorized pass if it is lost, they can receive rewards (points, etc.) at the underlying account when the short-term authorized pass is used, etc. The gift giver can further withdraw or cancel the short-term authorized pass. For example, if the receiver gets in trouble, bad grades, or the like, the short-term authorized pass could be canceled by the giver.

As will be described in detail, the various embodiments of the present invention do not merely implement conventional non-integrated credit account processes on a computer. Instead, the various embodiments of the present invention, in part, provide a previously unknown procedure for generating, providing, tracking, and paying for a gift card.

Moreover, the embodiments do not recite a mathematical algorithm; nor do they recite a fundamental economic or longstanding commercial practice. Instead, they address a known problem in gift card presentation and utilization. Thus, the embodiments do not "merely recite the performance of some business practice known from the pre-Internet world along with the requirement to perform it on the Internet". Instead, the embodiments are necessarily rooted in computer-based credit account technology in order to overcome a problem specifically arising in the realm of gift card management.

Operation

Referring now to FIG. 1, a block diagram 10 of a mobile device 11 is shown. Although a number of components are shown as part of mobile device 11, it should be appreciated that other, different, more, or fewer components may be found on mobile device 11.

In general, mobile device 11 is an example of a customer's mobile device, a store's mobile device, an associate's mobile device, or the like. Mobile device 11 could be a mobile phone, a smart phone, a tablet, a smart watch, a piece of smart jewelry, smart glasses, or other user portable devices having wireless connectivity. For example, mobile device 11 would be capable of broadcasting and receiving via at least one network, such as, but not limited to, WiFi, Cellular, Bluetooth, NFC, and the like. In one embodiment, mobile device 11 includes a display 718, a processor 706, a memory 710, a GPS 18, a camera 19, and the like. In one embodiment, instead of providing GPS information, the location of mobile device 11 may be determined within a given radius, such as the broadcast range of an identified beacon, a WiFi hotspot, overlapped area covered by a plurality of mobile telephone signal providers, or the like.

Mobile device 11 also includes a digital or mobile wallet 12 which is an electronic application that operates on mobile device 11. Mobile wallet 12 includes short-term authorized pass 13. Although short-term authorized pass 13 is shown as part of mobile wallet 12, it should be appreciated that short-term authorized pass 13 could be located in a different application operating on mobile device 11, as part of an email, text, or the like.

Figure 2:
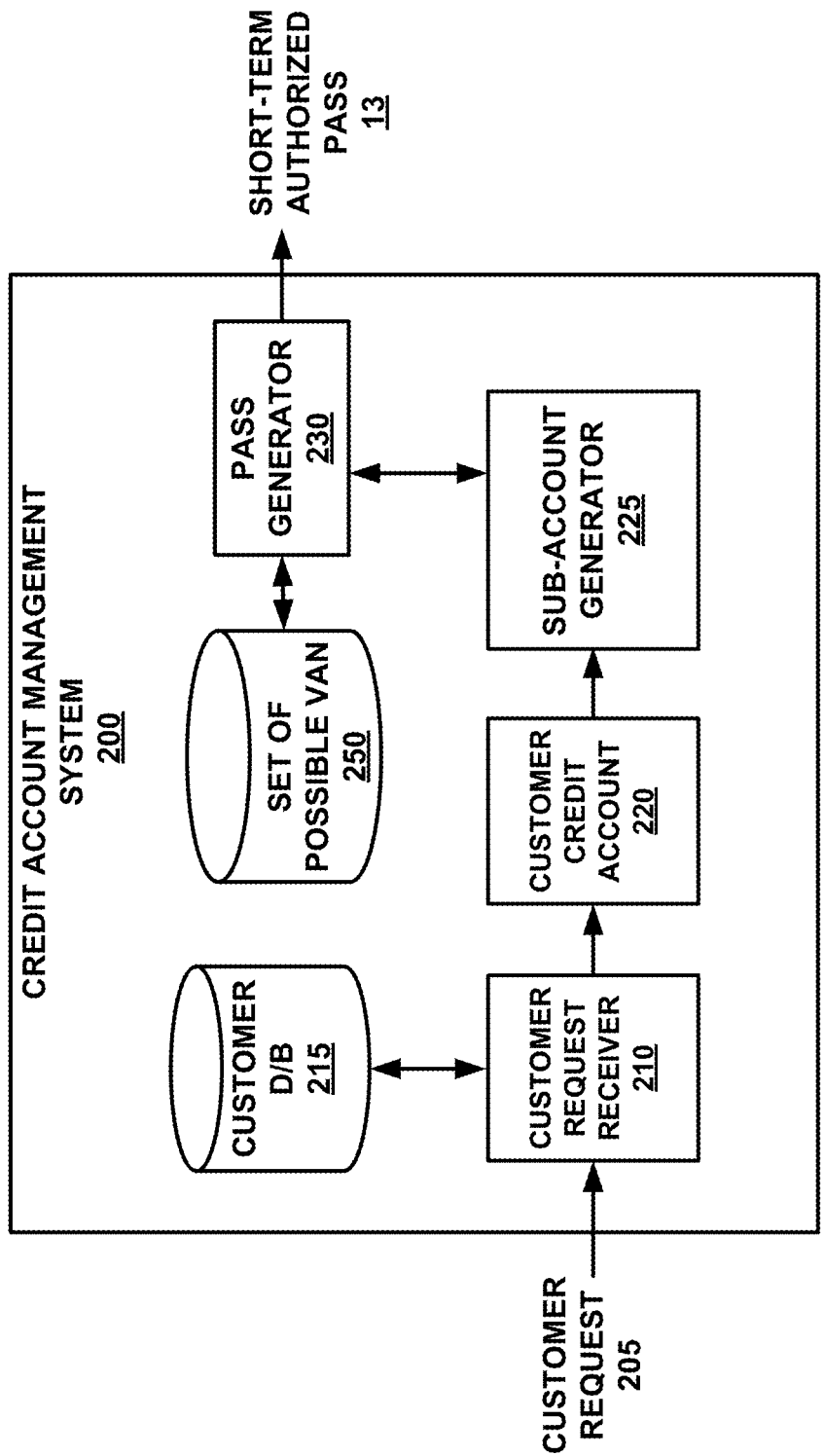
FIG. 2 is a block diagram of a credit account management system to generate a short-term authorized pass, in accordance with an embodiment.

FIG. 2 is a block diagram of credit account management system 200 to generate a short-term authorized pass, in accordance with an embodiment. Credit account management system 200 of FIG. 2 includes a customer request receiver 210, a customer database 215, a customer credit account 220, a sub-account generator 225, a pass generator 230, a database of possible VAN 250. In one embodiment, credit account management system 200 receives a customer request 205 for the generation of a short-term authorized pass and provides a short-term authorized pass 13.

In one embodiment, the credit-based payment processor has a set of possible VAN 250 from which each short-term authorized pass is pulled. The set of possible VAN 250 is a set of numbers that conform to credit-based transaction rules and standards such that they can be used in the same manner as a normal credit account would be used.

In one embodiment, a customer request 205 is received at the customer request receiver 210 which performs a look up via a customer database 215 to identify the customer and obtain the customer credit account 220 associated with the customer that provided the customer request 205. Once the customer credit account 220 is identified, the sub-account generator 225 generates a sub-account and associates the sub-account with the customer credit account 220. The sub-account generator 225 provides a credit limit to the sub-account, which in one embodiment, is the amount requested by the customer in the customer request 205.

A pass generator 230 pulls a valid credit card number, valid expiration date and a valid security code from the set of possible VAN 250, links the VAN information for the sub-account to the customer credit account 220, and generates a customer short-term authorized pass 13. In one embodiment, the valid credit card number, valid expiration date and a valid security code of the customer short-term authorized pass 13 are not tied directly to the customer's Primary Account Number. In one embodiment, the VAN conforms to a payment card industry (PCI) standard. In one embodiment, pass generator 230 provides an expiration date on the short-term authorized pass 13.

Figure 3:
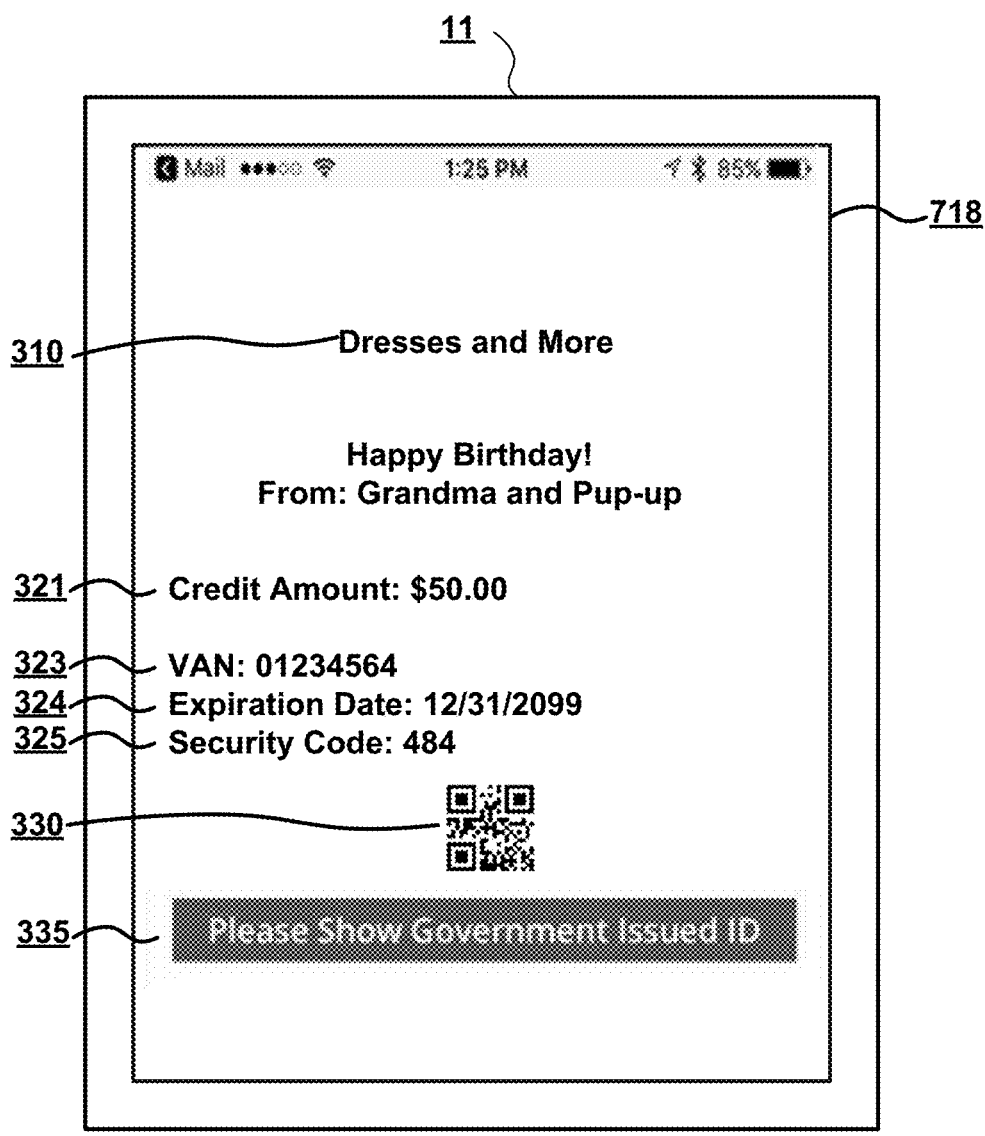
FIG. 3 is a block diagram of a short-term authorized pass as presented on a display screen of a mobile device, in accordance with an embodiment.

With reference now to FIG. 3, a block diagram of a short-term authorized pass 13 as presented on a display screen 718 of a mobile device 11 is shown in accordance with an embodiment. Although a number of different features are shown in conjunction with the description of short-term authorized pass 13, it should be appreciated that some embodiments may include additional features or may skip some of the features altogether.

In one embodiment, the short-term authorized pass 13 is received at mobile device 11 from pass generator 230 (of FIG. 2) via a delivery method such as, but not limited to: a text, an email, a mobile push to a mobile wallet 12, via a network such as near field communication (NFC), Bluetooth, WiFi, or the like.

For example, the pass generator 230 will send a message to mobile device 11 which will include the short-term authorized pass 13 information such that the opening of the text message will result in the insertion of the short-term authorized pass 13 into mobile wallet 12. As such, the user can access the mobile wallet 12 and open the short-term authorized pass 13.

In a mobile push scenario, the pass generator 230 will push the short-term authorized pass 13 information to mobile device 11. In one embodiment, the result of the push will be the receipt of short-term authorized pass 13 at mobile device 11, such as in the mobile wallet 12, an application operating on mobile device 11, or the like. In another embodiment, the result of the push, text message, beacon data reception, etc. will be the receipt of a link to short-term authorized pass 13. After the link is received, the user will have to follow the link on mobile device 11 to obtain the short-term authorized pass 13 at mobile device 11.

Information 310 refers to the identification information such as where the short-term authorized pass 13 can be used. For example, if the short-term authorized pass 13 is brand specific to "Dresses and More", then it would include the name "Dresses and More" to indicate to the recipient where it can be used.

Identifier 315 is a message that can optionally be provided on short-term authorized pass 13, to identify the giver, the reason for the gift, etc.

Credit amount 321 is the value or amount of credit available on the short-term authorized pass 13. In one embodiment, credit amount 321 is fixed.

In another embodiment, credit amount 321 will reflect the remaining balance of short-term authorized pass 13. For example, short-term authorized pass 13 could initially have a credit amount of $50.00. After short-term authorized pass 13 is used to make a purchase (e.g., $35.00) in one embodiment, the credit amount 321 would automatically update to reflect the remaining amount (e.g., $15.00).

VAN 323 is the credit account number that is assigned to short-term authorized pass 13 and is linked to the underlying customer credit account 220, but it is not the underlying customer credit account number.

Expiration date 324 is generally not related to the underlying customer credit account 220 but is instead an expiration for the short-term authorized pass 13. In one embodiment, expiration date 324 is provided not as an expiration but to provide the ability for the short-term authorized pass 13 to be used. For example, the expiration date 324 is provided to enable short-term authorized pass 13 to make a purchase. In one embodiment, the expiration date 324 is an actual expiration date of short-term authorized pass 13. It could be a year, two-years, 6-months or the like, and could be selected by the customer or automatically provided by credit account management system 200.

Security code 325 is also not related to the underlying account specifically, but is instead provided as it may be necessary when making a purchase utilizing the short-term authorized pass 13.

In one embodiment, short-term authorized pass 13 includes a scanable code 330, such as a barcode, QR code, or the like. In one embodiment, code 330 is scanned by the retailer/clerk at the register or during the time of checkout to provide the short-term authorized pass 13 details to the POS.

In one embodiment, short-term authorized pass 13 also displays a show government issued ID 330 to prompt the user to show identification to the retailer.

Referring now to FIG. 4, a flowchart of a method for generating a short-term authorized pass for presentment on the display screen of a mobile device is shown in accordance with an embodiment. In one embodiment, the credit account is a brand credit account and the associated short-term authorized pass is only useable for the brand. For example, if the customer's branded credit account is a Michelle's boating supply branded card, then the gift recipient would receive a short-term authorized pass for use at Michelle's boating supply. In addition, the gift recipient would be provided with the amount of money available on the short-term authorized pass (e.g., $25). In another embodiment, the credit account is a co-branded credit account and the short-term authorized pass is useable in many, or all, locations where a credit card can be used.

With reference now to 402 of FIG. 4, one embodiment receives, at a credit account management system, a request for a short-term authorized pass to be provided from a credit account of the first party to the second party, the request comprising: an amount to be allocated to the short-term authorized pass, and an identifier for the second party.

In one embodiment, the creation of the short-term authorized pass is initiated by the giver. For example, the giver could access: a kiosk in a store, a website, an application (app) on a device, a web app, making a telephone call, requesting the assignment at a point-of-sale (POS), from a store associate, or the like. In one embodiment, the initiation of the process occurs via a computing device such as, but not limited to, a mobile device, a work computer, a home computer, a smart TV, etc.

In general, the creation of the short-term authorized pass does not require the giver to provide any monies, spend any money, or the like. Instead, during the creation of the short-term authorized pass, a hold is placed on the requested amount of the underlying credit account. For example, if the short-term authorized pass is for 75 dollars, then a hold on 75 dollars' worth of credit would be provided on the credit account's credit limit. For example, if the credit account's credit limit is 3,500 dollars, then the new credit limit would be 3,425 dollars. In so doing, the short-term authorized pass would remain funded and the giver would not be able to surpass their credit limit for the credit account. Once the amount on the short-term authorized pass was spent or the short-term authorized pass was otherwise deactivated, the hold would be removed, and the credit limit on the original credit account would return to 3,500 dollars.

In one embodiment, the identifier of the second party is a mailing address and the short-term authorized pass 400 is a physical card and is sent to the mailing address of the second party.

In one embodiment, the short-term authorized pass 400 is digital. In addition, the identifier of the second party is an email address and the short-term authorized pass 400 is sent to the email address of the second party. In another embodiment, the identifier of the second party is a mobile phone number and the short-term authorized pass 400 is sent via an SMS to mobile device 11 of the second party.

In one embodiment, the short-term authorized pass 400 is automatically added to a digital or mobile wallet 12 on a mobile device 11 of the second party when the short-term authorized pass 400 is received at the mobile device 11.

Referring now to 404 of FIG. 4, one embodiment generates a sub-account from the credit account, comprising: allocating a part of the credit account to form a sub-account; setting a credit limit on the sub-account to the amount to be allocated; assigning a virtual account number (VAN) to the sub-account; and generating the short-term authorized pass using the VAN of the sub-account.

With reference now to 406 of FIG. 4, one embodiment provides, from the credit account management system and to the second party, the short-term authorized pass, wherein no funds are taken from the credit account of the first party until the short-term authorized pass is used.

When the short-term authorized pass is used, the underlying credit account is billed. Thus, the purchase is shown on the giver's credit account statement. In one embodiment, there is no fee charged for giving a short-term authorized pass. In other words, unlike a store-bought gift-card that includes an activation fee, the short-term authorized pass would be free to the credit account holder. In another embodiment, there is a fee charged for creating/giving a short-term authorized pass, or for the 5th or greater short-term authorized pass created per year, etc.

Further, by being able to quickly and easily authorize and deliver a short-term authorized pass to a recipient (e.g., via a digital delivery to a recipient's mobile device, digital wallet, etc.), the giver is able to use this capability to provide a person (that is not of age or otherwise without a credit account) to have a credit purchasing capability with the short-term authorized pass versus the person using the giver's credit card, debit card, etc. For example, a 17-year-old needs to get gas at a gas station, buy a winter coat, or the like. Instead of the parent providing cash or a credit card to the 17-year-old (and thus having limited control over any of the purchases made on the card, such as food, drinks, clothes, etc.), the parent could provide the short-term authorized pass for a limited amount of money (e.g., 50 dollars for gas, 200 dollars for a jacket, etc.). In so doing, not only would the parent's cash, credit, or debit account be safe from any additional costs, the parents would also receive a report of the spending that occurred.

In one embodiment, since the giver is notified about the amount spent, the giver can cancel the short-term authorized pass after one or more purchases are made even when the actual amount spent is less than the amount authorized. For example, if the short-term authorized pass was for 50 dollars for gas, and the recipient only spent 30 dollars on gas. The short-term authorized pass could be canceled after only 30 dollars had been spent by the giver.

Similarly, the short-term authorized pass could be initially authorized with a credit limit that is more than the amount needed to cover the expected purchase expense, and then after the actual purchase is made, the short-term authorized pass could be terminated. For example, a daughter wants to purchase a winter coat that she believe costs 100 dollars, but she is not certain. Since the parents are not sure of the cost, they set up the short-term authorized pass with an initial limit that is certain to be able to cover the cost of the coat (e.g., 130 dollars). If the daughter buys the coat for 111 dollars, then the parent's credit account is only charged for the amount of money actually spent with the short-term authorized pass (e.g., 111 dollars) and not the initial amount of money designated to the short-term authorized pass (e.g., 130 dollars). Then, when the short-term authorized pass expires (or is canceled) the 19 dollars would remain unspent.

In another embodiment, the daughter wants to purchase a winter coat with a short-term authorized pass having a 100-dollar credit limit. If the daughter buys a coat for 125 dollars, then the gift giver's credit account is only charged for the amount of money actually spent with the short-term authorized pass (e.g., 100 dollars) and the remaining 25 dollars would have to be paid by the daughter using another revenue source.

In yet another embodiment, the daughter wants to purchase a winter coat and the parents provide her with a short-term authorized pass having a 100-dollar credit limit. If the daughter finds a coat for 125 dollars, she could contact her parents and request an increase in the short-term authorized pass credit limit to 125 dollars to cover the additional costs. The parents can either agree and increase the credit limit of the short-term authorized pass to 125 dollars or else disagree and maintain the initial amount (e.g., 100 dollars), such that the remaining 25 dollars would have to be paid by the daughter from a different source.

In one embodiment, the short-term authorized pass can help build clientele via at least one previously unattainable acquisition channels. For example, by providing the daughter (in the above example) with the short-term authorized pass (such as to a given clothing establishment), the daughter would be able to have a shopping "experience" at the clothing establishment. This shopping "experience" would be an opportunity for the given clothing establishment to provide rewards, coupons, discounts, services, support, and guidance that could blossom into a long-lasting relationship that would include brand loyalty, obtaining of a branded credit account by the daughter, social media feedback that would provide brand recognition, etc.

In another example of how the short-term authorized pass will build clientele, a parent (or grandparent) could give the short-term authorized pass to a recipient that is too young to have their own credit account. When the recipient becomes of age to apply for a credit account, the branded account could realize that the recipient had received a number of short-term authorized passes for a given clothing store, gas station, etc. The clothing store could then provide a credit opportunity for the recipient (or to the parent or grandparent that had been previously providing the short-term authorized pass to the recipient) to apply for their own branded credit account with the store. In one embodiment, if the credit opportunity was provided to the parent or the grandparent, the opportunity could include a reward in conjunction with the opportunity.

Similarly, a parent (or grandparent) could give a number of short-term authorized passes to a given recipient every year. Based on the knowledge about the number of short-term authorized passes received, the one or more stores where the recipient used the short-term authorized passes, and the like, it is possible to utilize the data from the short-term authorized pass to provide offers, rewards, credit account opportunities, and the like to one or both of the giver and the recipient of the short-term authorized passes. This data would provide another means for building clientele.

In one embodiment, the system is proactive, e.g., send a reminder to a customer that it is almost someone's birthday and that a short-term authorized pass could be delivered to that person before or on their birthday, etc. Similarly, the system could be set up to automatically create and deliver a short-term authorized pass from the customer to the recipient on a given day every year (e.g., such as an anniversary, birthday, holiday, etc.). Further, the amount on the short-term authorized pass could be automatically adjusted each year (e.g., increase 3% per year), unmodified without a customer's specific adjustment (e.g., 20 dollars to Suzy each year on her birthday), or the like. In one embodiment, there can be any number of short-term authorized passes created for a given credit account, as long as the total of the short-term authorized passes did not extend beyond the credit accounts' credit limit.

In one embodiment, an indicator is provided to the first party (e.g., the customer of customer credit account 220) when the short-term authorized pass 400 is used to make a purchase. In one embodiment, the indicator indicates an amount of money spent and a location where the short-term authorized pass 400 was used.

In one embodiment, a reminder is provided to the second party. The reminder is provided after a pre-defined amount of time and indicates that the short-term authorized pass 400 is still active.

In one embodiment, an expiration date 324 is provided with the short-term authorized pass and the short-term authorized pass 400 is expired after the expiration date 324 has passed. In addition, an expiration reminder can be provided to the second party. The expiration reminder provides the recipient with a pre-defined amount of time before the expiration date of the short-term authorized pass 400 while also acting as a reminder indicating that the short-term authorized pass 400 is still active.

In one embodiment, the short-term authorized pass 400 is non-rechargeable. That is, once the short-term authorized pass 400 is used, it is terminated. Any desire by the customer to provide a recharge to the terminated short-term authorized pass 400 would be resolved by the generation of a new short-term authorized pass 400 with a new VAN, etc.

However, in one embodiment the first party (e.g., the customer with the credit account) can make a request for an increase in the amount to be allocated to the short-term authorized pass 400. As long as short-term authorized pass 400 is not terminated or expired, the credit limit on the sub-account can be increased to the new amount requested by the first party.

Figure 5:
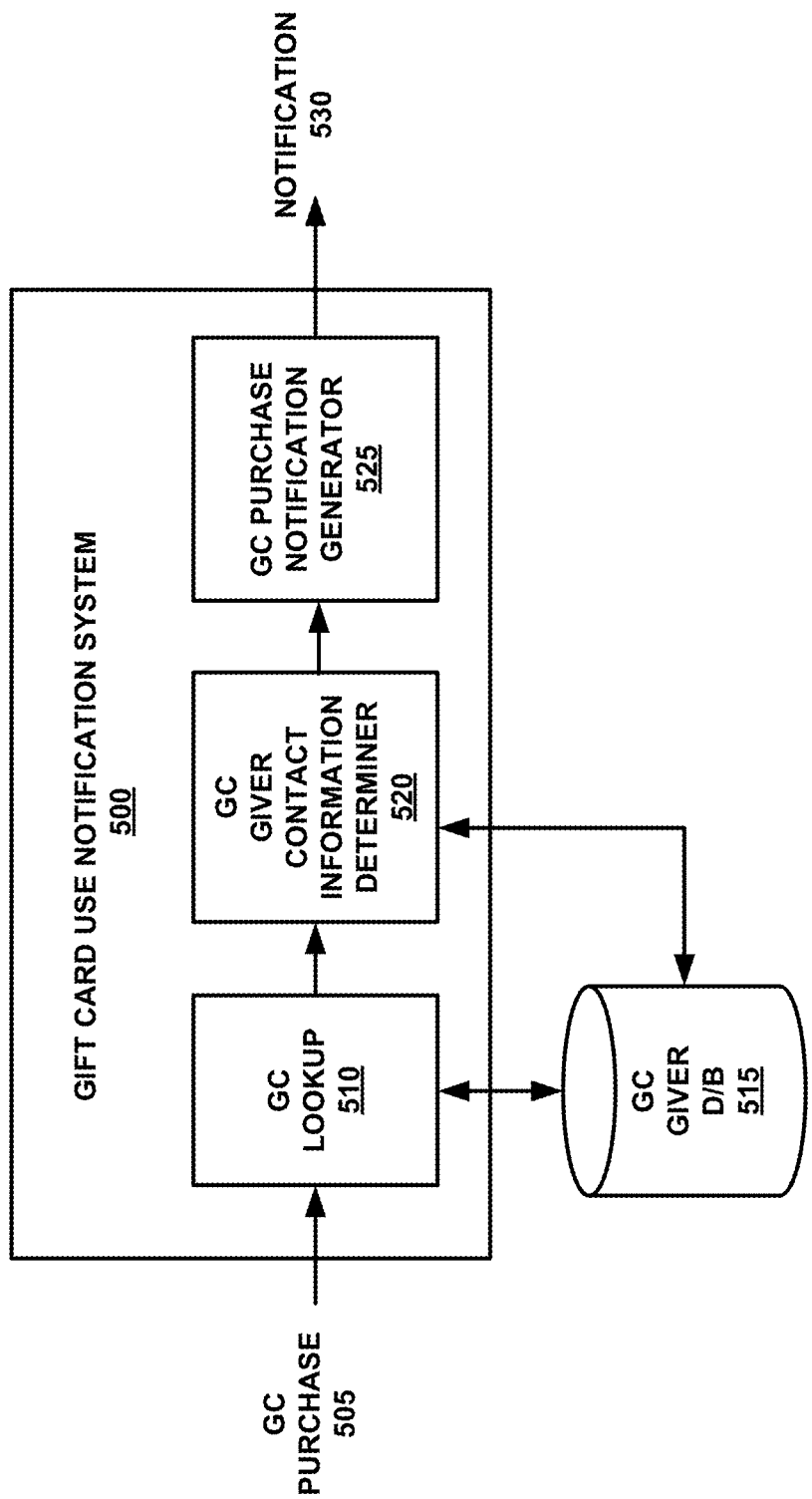
FIG. 5 is a block diagram of a gift card use notification system, in accordance with an embodiment.

Referring now to FIG. 5, a block diagram of a gift card use notification system 500 is shown in accordance with an embodiment.

Gift card use notification system 500 of FIG. 5 includes a gift card purchase indicator 505, a gift card look-up 510, a gift card giver database 515, a gift card giver contact information determiner 520, a gift card purchase notification generator 525, and notification 530. In one embodiment, gift card use notification system 500 receives the gift card purchase indicator 505 which includes information that identifies a specific gift card, uses the information to identify the original giver of the gift card (customer) and provides notification 530 to the customer that the gift card has been used.

In one embodiment, the identifying information included with gift card purchase indicator 505 is a set of numbers (numbers and letters, letters, etc.) that act as a unique identifier to identify the specific gift card. In one embodiment, the identifying information included with gift card purchase indicator 505 can include information such as, but not limited to, an amount of money spent on the purchase, a location where the specific gift card was used, an amount of money remaining on the specific gift card, what was purchased, and the like.

In one embodiment, gift card purchase indicator 505 (and the information included therewith) is received at gift card look-up 510 which performs a look up via a gift card giver database 515 to identify the customer that gave the specific gift card. Once the customer is identified, gift card giver contact information determiner 520 will review the customer's file to determine the appropriate contact information for the customer. For example, the contact information for the customer could be, but is not limited to, a mailing address, an email address, a number for a mobile device, and the like.

In one embodiment, the preferred means of contact is included in the file, wherein the customer has indicated the preferred contact information to be used. In one embodiment, there may be no preference and gift card purchase notification generator 525 will default to an assigned contact order. E.g., email, text, mail, or the like. Moreover, although a default order is described, in one embodiment, the default order may be different based on laws, rules, statutes, personal preference, gift card provider preference, etc.

In one embodiment, gift card purchase notification generator 525 generates a notification 530 to be provided to the customer that gave the specific gift card. In one embodiment, the notification 530 is a note that lets the customer know that the gift card was used. In another embodiment, the notification 530 can include other information such as, an amount of money spent on the purchase, a location where the specific gift card was used, an amount of money remaining on the specific gift card, what item(s) were purchased, an impending expiration of the specific gift card having a remaining balance, or the like.

In one embodiment, the type of information provided in the use notification could be determined by card use notification system 500, by the applicable laws and statutes, defined by the customer that gave the specific gift card, designated by the user of the specific gift card, or the like.

In one embodiment, gift card purchase notification generator 525 provides the notification 530 to the customer via the determined customer contact information as designated by gift card giver contact information determiner 520.

With reference now to FIG. 6, a flowchart 600 of a method for providing gift card use notification is shown in accordance with an embodiment.

Referring now to 602 of FIG. 6, one embodiment receives, at gift card use notification system 500, an indication that a specific gift card was used for a purchase. In one embodiment the specific gift card is a company specific, brand specific, or store specific gift card. In one embodiment, the specific gift card is a short-term authorized pass as described herein.

In one embodiment, the indication includes information such as a unique identifier for the specific gift card. In one embodiment, the indication includes other purchase aspects such as, an impending expiration of the specific gift card when there is a remaining balance, an amount of money spent on the purchase, a location where the specific gift card was used, an amount of money remaining on the specific gift card, what was purchased, and the like.

With reference now to 604 of FIG. 6, one embodiment uses information from the indication to identify the customer that had given the specific gift card.

Referring now to 606 of FIG. 6, one embodiment determines the contact information for the customer that had gifted the specific gift card. In one embodiment, the contact information for the customer is a mailing address, an email address, a number for a mobile device, and the like.

With reference now to 608 of FIG. 6, one embodiment provides, from the gift card use notification system and to the customer via the contact information, a use notification indicating that the specific gift card had been used.

In one embodiment, in addition to the use notification providing an indication to the customer that the gift card was used for a purchase, the use notification can include other purchase aspects, such as an amount of money spent on the purchase, a location where the specific gift card was used, an amount of money remaining on the specific gift card, an impending expiration of the specific gift card, what item(s) were purchased, or the like. In one embodiment, the type of information provided in the use notification could be determined by gift card use notification system 500, by the applicable laws and statutes, defined by the customer that gave the specific gift card, designated by the user of the specific gift card, or the like.

In one embodiment, the contact information for the customer is a mailing address and the use notification is sent to the mailing address. In one embodiment, the contact information for the customer is an email address and the use notification is sent to the email address. In one embodiment, the contact information for the customer is a number for a mobile device and the use notification is sent to the mobile device via a voice call, a text message, an alert to an application operating on the mobile device, and the like.

Example Computer System

Figure 7:
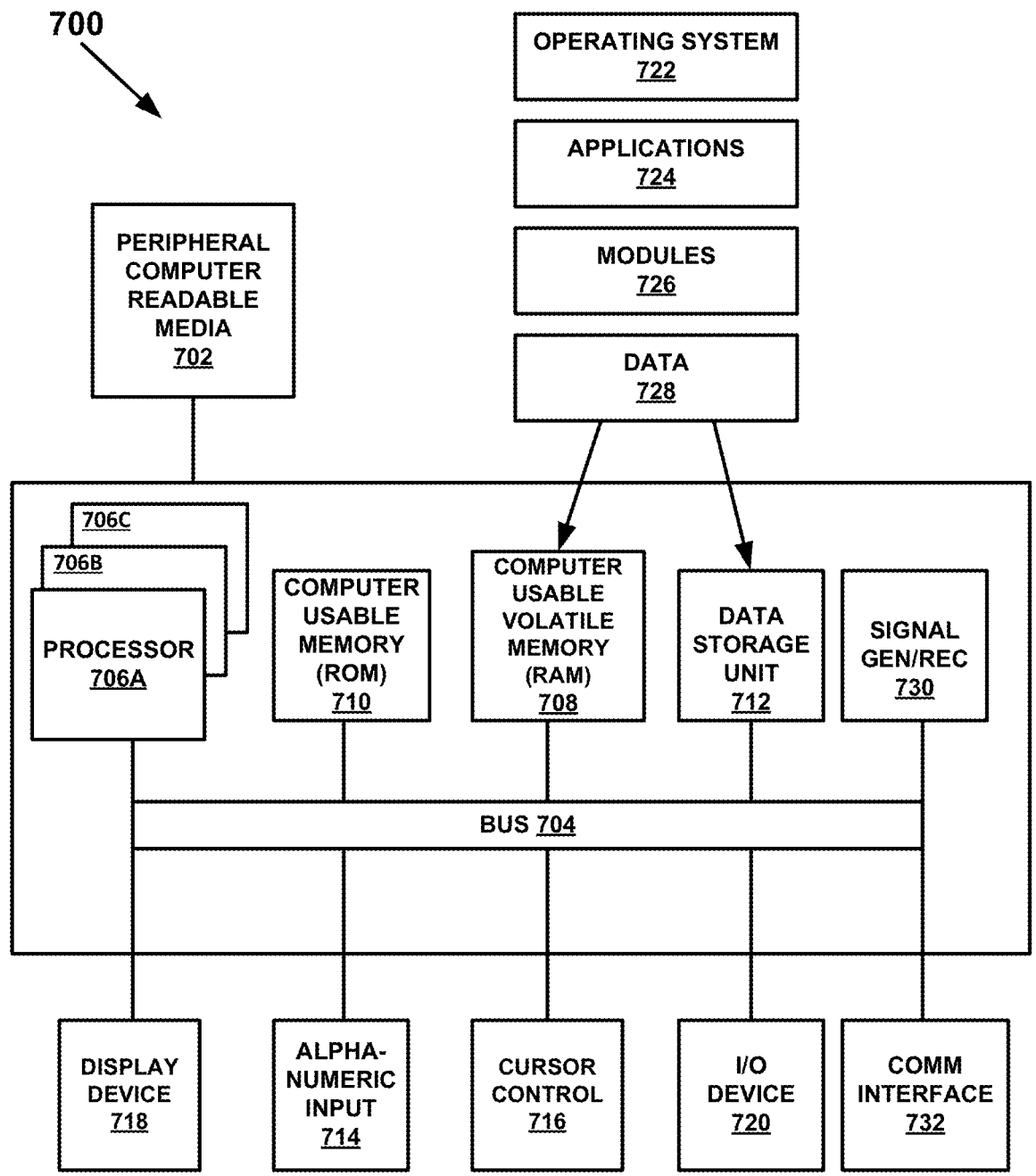
FIG. 7 is a block diagram of an example computer system with which or upon which various embodiments of the present invention may be implemented.

With reference now to FIG. 7, portions of the technology for providing a communication composed of computer-readable and computer-executable instructions that reside, for example, in non-transitory computer-readable medium (or storage media, etc.) of a computer system. That is, FIG. 7 illustrates one example of a type of computer that can be used to implement embodiments of the present technology. FIG. 7 represents a system or components that may be used in conjunction with aspects of the present technology. In one embodiment, some or all of the components described herein may be combined with some or all of the components of FIG. 7 to practice the present technology.

FIG. 7 illustrates an example computer system 700 used in accordance with embodiments of the present technology.

It is appreciated that computer system 700 of FIG. 7 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 7, computer system 700 of FIG. 7 is well adapted to having peripheral computer readable media 702 such as, for example, a disk, a compact disc, a flash drive, and the like coupled thereto.

Computer system 700 of FIG. 7 includes an address/data/control bus 704 for communicating information, and a processor 706A coupled to bus 704 for processing information and instructions. As depicted in FIG. 7, computer system 700 is also well suited to a multi-processor environment in which a plurality of processors 706A, 706B, and 706C are present. Conversely, computer system 700 is also well suited to having a single processor such as, for example, processor 706A. Processors 706A, 706B, and 706C may be any of various types of microprocessors. Computer system 700 also includes data storage features such as a computer usable volatile memory 708, e.g., random access memory (RAM), coupled to bus 704 for storing information and instructions for processors 706A, 706B, and 706C.

Computer system 700 also includes computer usable non-volatile memory 710, e.g., read only memory (ROM), coupled to bus 704 for storing static information and instructions for processors 706A, 706B, and 706C. Also present in computer system 700 is a data storage unit 712 (e.g., a magnetic disk drive, optical disk drive, solid state drive (SSD), and the like) coupled to bus 704 for storing information and instructions. Computer system 700 also can optionally include an alpha-numeric input device 714 including alphanumeric and function keys coupled to bus 704 for communicating information and command selections to processor 706A or processors 706A, 706B, and 706C. Computer system 700 also can optionally include a cursor control device 716 coupled to bus 704 for communicating user input information and command selections to processor 706A or processors 706A, 706B, and 706C. Cursor control device may be a touch sensor, gesture recognition device, and the like. Computer system 700 of the present embodiment can optionally include a display device 718 coupled to bus 704 for displaying information.

Referring still to FIG. 7, display device 718 of FIG. 7 may be a liquid crystal device, cathode ray tube, OLED, plasma display device or other display device suitable for creating graphic images and alpha-numeric characters recognizable to a user. Cursor control device 716 allows the computer user to dynamically signal the movement of a visible symbol (cursor) on a display screen of display device 718. Many implementations of cursor control device 716 are known in the art including a trackball, mouse, touch pad, joystick, non-contact input, gesture recognition, voice commands, bio recognition, and the like. In addition, special keys on alpha-numeric input device 714 capable of signaling movement of a given direction or manner of displacement. Alternatively, it will be appreciated that a cursor can be directed and/or activated via input from alpha-numeric input device 714 using special keys and key sequence commands.

Computer system 700 is also well suited to having a cursor directed by other means such as, for example, voice commands. Computer system 700 also includes an I/O device 720 for coupling computer system 700 with external entities. For example, in one embodiment, I/O device 720 is a modem for enabling wired or wireless communications between computer system 700 and an external network such as, but not limited to, the Internet or intranet. A more detailed discussion of the present technology is found below.

Referring still to FIG. 7, various other components are depicted for computer system 700. Specifically, when present, an operating system 722, applications 724, modules 726, and data 728 are shown as typically residing in one or some combination of computer usable volatile memory 708, e.g. random-access memory (RAM), and data storage unit 712. However, it is appreciated that in some embodiments, operating system 722 may be stored in other locations such as on a network or on a flash drive; and that further, operating system 722 may be accessed from a remote location via, for example, a coupling to the internet. In one embodiment, the present technology, for example, is stored as an application 724 or module 726 in memory locations within RAM 708 and memory areas within data storage unit 712. The present technology may be applied to one or more elements of described computer system 700.

Computer system 700 also includes one or more signal generating and receiving device(s) 730 coupled with bus 704 for enabling computer system 700 to interface with other electronic devices and computer systems. Signal generating and receiving device(s) 730 of the present embodiment may include wired serial adaptors, modems, and network adaptors, wireless modems, and wireless network adaptors, and other such communication technology. The signal generating and receiving device(s) 730 may work in conjunction with one (or more) communication interface 732 for coupling information to and/or from computer system 700. Communication interface 732 may include a serial port, parallel port, Universal Serial Bus (USB), Ethernet port, Bluetooth, thunderbolt, near field communications port, WiFi, Cellular modem, or other input/output interface. Communication interface 732 may physically, electrically, optically, or wirelessly (e.g., via radio frequency) couple computer system 700 with another device, such as a mobile phone, radio, or computer system.

Computer system 700 is only one example of a suitable computing environment and is not intended to suggest any limitation as to the scope of use or functionality of the present technology. Neither should the computing environment be interpreted as having any dependency or requirement relating to any one or combination of components illustrated in the example computer system 700.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended Claims is not necessarily limited to the specific features or acts described above. Rather, the specific features and acts described above are disclosed by way of illustration and as example forms of implementing the Claims and their equivalents.

What is claimed is:

1. A method for gift card use notification, the method comprising:
   receiving, at a credit account management system, a request for a specific gift card to be provided from a credit account of a customer to a second party,
   said request comprising:
      an amount to be allocated to said specific gift card, and
      an identifier for said second party;
   generating a sub-account from said credit account, comprising:
      allocating a part of said credit account to form a sub-account;
      setting a credit limit on said sub-account to said amount to be allocated;
      assigning a virtual account number (VAN) to said sub-account; and
      generating said specific gift card using said VAN of said sub-account, said specific gift card is generated in a digital format;
   electronically transmitting, from said credit account management system and to a mobile device of said second party, said specific gift card, wherein no funds are taken from said credit account of said customer until said specific gift card is used;
   automatically adding said specific gift card to a digital wallet on said mobile device of said second party when said specific gift card is received at said mobile device of said second party;
   receiving, at a gift card use notification system, an indication that said specific gift card was used for a purchase;
   using an information from the indication to identify said customer that had given the specific gift card;
   determining a contact information for the customer that had given the specific gift card; and
   providing, from the gift card use notification system and to the customer via the contact information, a use notification indicating that the specific gift card had been used.

2. The method of claim 1, wherein the indication comprises:
   a unique identifier for the specific gift card.

3. The method of claim 1, wherein the specific gift card is a short-term authorized pass.

4. The method of claim 1, wherein the contact information for the customer is a physical mailing address and the use notification is sent to the physical mailing address.

5. The method of claim 1, wherein the contact information for the customer is an email address and the use notification is sent to the email address.

6. The method of claim 1, wherein the contact information for the customer is a number for a mobile device; and
   the use notification is sent to the mobile device via a mobile device communications method from the group consisting of: a voice call, a text message, and an alert to an application operating on the mobile device.

7. The method of claim 1, wherein the use notification further comprises:

an amount of money spent; and
a location where the specific gift card was used.

8. A non-transitory computer-readable medium for storing instructions, the instructions comprising:
one or more instructions which, when executed by one or more processors, cause one or more processors to:
receive, at a credit account of a customer and from a customer, a request for a specific gift card to be generated from said credit account of said customer and provided to a second party,
said request comprises an amount to be allocated to said specific gift card;
receive, at said credit account of said customer and from said customer, an identifier for said second party;
generate a sub-account from said credit account, wherein said one or more processors:
allocate a part of said credit account to form a sub-account;
set a credit limit on said sub-account to said amount identified by said customer;
assign a virtual account number (VAN) to said sub-account;
link said VAN of said sub-account to said credit account; and
generate said specific gift card using said VAN of said sub-account, said specific gift card generated in a digital format;
electronically transmit, from said credit account of said customer and to a mobile device of said second party, said specific gift card, wherein no funds are taken from said credit account of said customer until said specific gift card is used, said electronic transmission includes an instruction to cause said specific gift card to be automatically added to a digital wallet on said mobile device of said second party when said specific gift card is received at said mobile device of said second party;
receive, at a gift card use notification system, a notice that said specific gift card has been used for a purchase;
use, at the gift card use notification system, an information from the notice to identify said customer that had given the specific gift card;
determine, at the gift card use notification system, a contact information for the customer that had given the specific gift card;
generate, at the gift card use notification system, a use notification for the specific gift card; and
provide, from the gift card use notification system and to the customer via the contact information, the use notification.

9. The non-transitory computer-readable medium of claim 8, where the specific gift card is a short-term authorized pass.

10. The non-transitory computer-readable medium of claim 8, wherein the notice further comprises:
a unique identifier for the specific gift card.

11. The non-transitory computer-readable medium of claim 8, wherein the use notification further comprises:
an amount of money spent; and
a location where the specific gift card was used.

12. The non-transitory computer-readable medium of claim 8, wherein the contact information for the customer is a number for a mobile device; and
the use notification is sent to the mobile device via a mobile device communications method from the group consisting of: a voice call, a text message, and an alert to an application operating on the mobile device.

13. The non-transitory computer-readable medium of claim 8, wherein the contact information for the customer is a physical mailing address and the use notification is sent to the physical mailing address.

14. The non-transitory computer-readable medium of claim 8, wherein the contact information for the customer is an email address and the use notification is sent to the email address.

15. A system comprising:
a memory;
a storage; and
one or more processors to:
receive, at a credit account of a customer and from a customer, a request for a specific gift card to be generated from said credit account of said customer and provided to a second party,
said request comprises an amount to be allocated to said specific gift card;
receive, at said credit account of said customer and from said customer, an identifier for said second party;
generate a sub-account from said credit account, wherein said one or more processors:
allocate a part of said credit account to form a sub-account;
set a credit limit on said sub-account to said amount identified by said customer;
assign a virtual account number (VAN) to said sub-account;
link said VAN of said sub-account to said credit account; and
generate said specific gift card using said VAN of said sub-account, said specific gift card generated in a digital format;
electronically transmit, from said credit account of said customer and to a mobile device of said second party, said specific gift card, wherein no funds are taken from said credit account of said customer until said specific gift card is used, said electronic transmission includes an instruction to cause said specific gift card to be automatically added to a digital wallet on said mobile device of said second party when said specific gift card is received at said mobile device of said second party;
receive a notice that said specific gift card has been used for a purchase;
use an information from the notice to identify said customer that had given the specific gift card;
determine a contact information for the customer that had given the specific gift card;
generate a use notification that the specific gift card has been used; and
provide the use notification to the customer via the contact information for the customer.

16. The system of claim 15, wherein the specific gift card is a short-term authorized pass.

17. The system of claim 15, wherein the notice further comprises:
a unique identifier for the specific gift card.

18. The system of claim 15, wherein the use notification further comprises:
an amount of money spent; and
a location where the specific gift card was used.

19. The system of claim 15, wherein the contact information for the customer is a number for a mobile device; and the use notification is sent to the mobile device via a mobile device communications method from the group consisting of: a voice call, a text message, and an alert to an application operating on the mobile device.

20. The system of claim 15, wherein the contact information for the customer is an email address and the use notification is sent to the email address.

\* \* \* \* \*